(12) United States Patent
Yang et al.

(10) Patent No.: US 10,968,245 B2
(45) Date of Patent: Apr. 6, 2021

(54) METHOD FOR PREPARING TRICARBONYL TECHNETIUM-99M INTERMEDIATE

(71) Applicant: Institute of High Energy Physics, Chinese Academy of Sciences, Beijing (CN)

(72) Inventors: Wenjiang Yang, Beijing (CN); Yu Liu, Beijing (CN); Jingquan Xue, Beijing (CN); Yanhua Zhang, Beijing (CN)

(73) Assignee: Institute of High Energy Physics, Chinese Academy of Sciences, Beijing (CN)

( * ) Notice: Subject to any disclaimer, the term of this patent is extended or adjusted under 35 U.S.C. 154(b) by 0 days.

(21) Appl. No.: 16/464,919

(22) PCT Filed: Dec. 28, 2016

(86) PCT No.: PCT/CN2016/112642
§ 371 (c)(1),
(2) Date: May 29, 2019

(87) PCT Pub. No.: WO2018/107526
PCT Pub. Date: Jun. 21, 2018

(65) Prior Publication Data
US 2020/0010496 A1 Jan. 9, 2020

(30) Foreign Application Priority Data
Dec. 15, 2016 (CN) .......................... 201611160206.6

(51) Int. Cl.
*A61K 51/00* (2006.01)
*A61M 36/14* (2006.01)
*C07F 17/00* (2006.01)

(52) U.S. Cl.
CPC .................................. *C07F 17/00* (2013.01)

(58) Field of Classification Search
CPC ...................................................... C07F 17/00
USPC ......................................................... 424/1.11
See application file for complete search history.

(56) References Cited

U.S. PATENT DOCUMENTS

| | | | | |
|---|---|---|---|---|
| 6,344,178 | B1 * | 2/2002 | Alberto ................ | A61K 51/088 424/1.65 |
| 6,958,243 | B2 * | 10/2005 | Larhed .................... | C07C 45/49 436/127 |
| 7,045,140 | B2 * | 5/2006 | Motterlini ........... | C07F 15/0053 424/423 |

FOREIGN PATENT DOCUMENTS

| | | | |
|---|---|---|---|
| CN | 1284493 | A | 2/2001 |
| CN | 1506372 | A | 6/2004 |
| CN | 102060880 | A | 5/2011 |
| CN | 103435655 | A * | 12/2013 |
| CN | 103435655 | A | 12/2013 |
| CN | 106745346 | A | 5/2017 |

OTHER PUBLICATIONS

Wald et al. Angew. Chem. Int. Ed. 2001, 40, 3062-3066. (Year: 2001).*
Zagorevskii et al. J. Organometall. Chem. 1980, 201-209. (Year: 1980).*
Loim et al. J. Organometall. Chem. 1981, 233-243. (Year: 1981).*
Alberto, R., et al. "A Novel Organometallic Aqua Complex of Technetium for the Labeling of Biomolecules: Synthesis of [99mTc(OH2)3(CO)3]+ from [99mTcO4]− in Aqueous Solution and Its Reaction with a Bifunctional Ligand". J Am. Chem. Sco. 120: 7987-7988. (1998).
Alberto, R, et al., "Synthesis and Properties of Boranocarbonate: A Convenient in Stiu CO Source for the Aqueous Preparation of [99mTc(OH2)3(CO)3]"; J. Am. Chem. Soc. (2001), vol. 123; pp. 3135-3136.
Zhang, Z. et al., "Gaseous Photodissociation Deposition Kinetics of Ultraviolet Photolysis of Mn2 (CO)10"; Chinese Journal of Chemical Physics (1997); vol. 10:5; 5 pgs.
Li, Y., "A Report on Research of Manganese Carbonyl Compounds"; China Manganese Industry (2003); vol. 21:1; 5 pgs.
Mu, J. "Thermal Decomposition of Metal Carbonyl Compunds"; Advanced Inorganic Cheminstry (2007); 4 pgs.

* cited by examiner

*Primary Examiner* — Johann R Richter
*Assistant Examiner* — Sean R Donohue
(74) *Attorney, Agent, or Firm* — Fox Rothschild LLP

(57) ABSTRACT

The invention provides a method for preparing a technetium-99m tricarbonyl intermediate. The method comprises reacting a manganese carbonyl compound used as a carbon monoxide source with pertechnetate and water to obtain the technetium-99m tricarbonyl intermediate. The method for preparing a technetium-99m tricarbonyl intermediate in an embodiment of the invention can complete the preparation of the intermediate at atmospheric pressure and room temperature. The method is easy to operate, uses easily obtained raw materials, has a high labeling yield, and can be used to prepare various types of technetium tricarbonyl labeled probes.

6 Claims, 2 Drawing Sheets

METHOD FOR PREPARING TRICARBONYL TECHNETIUM-99M INTERMEDIATE

TECHNICAL FIELD

The present invention relates to a method for preparing technetium-99m tricarbonyl intermediate, and particularly, to a method for preparing technetium-99m tricarbonyl intermediate at atmospheric pressure and room temperature.

BACKGROUND

By means of Molecular Imaging, a molecular process under normal or pathological state can be studied by way of non-invasive imaging technology. The molecular imaging diagnostic method in nuclear medicine, which comprises single photon emission computed tomography (SPECT) and positron emission tomography (PET), has been widely applied in clinical practice. It has a high specificity and a high sensitivity, and is therefore an important direction for the molecular imaging research.

The radionuclide technetium-99m ($^{99m}$Tc), as a good nuclide with characteristics of low cost, simple preparation, low radioactive dose and multi-valence, is well known as an excellent nuclide for SPECT. Among the monovalent metal technetium radiopharmaceuticals, the carbonyl technetium ($[^{99m}$Tc(CO)$_3]^+$) center has attracted scientists' much attention, in which $^{99m}$Tc(I) is at low-spin state of d$^6$ and is in kinetic inertia. Three coordination sites of the metal technetium are filled by electron-donating ligands of CO and the rest three sites may coordinate with many types of ligands to form an octahedral structure. The core $[^{99m}$Tc(CO)$_3]^+$ has good characteristics of small size, stable structure, resistance to oxidation, and easy preparation. For example, the complex of carbonyl technetium methoxy isobutyl isonitrile ($[^{99m}$Tc(CO)$_3$(MIBI)$_3]^+$) using the carbonyl technetium as the core has excellent biological properties.

At early stage, the technetium tricarbonyl complex is usually synthesized at high temperature and high pressure through a multi-step reaction, which is not feasible for the routine application in clinical practice. For example, Alberto et al. reported a method for preparing an aqueous organometallic complex $[^{99m}$Tc(H$_2$O)$_3$(CO)$_3]^+$ at low pressure (about 10$^5$ Pa). The complex is very stable in water and in air, and the water as ligand is easily substituted by other ligands with strong complexation ability, so that the carbonyl complex may be used as a radiopharmaceutical in nuclear medicine. In the method, the technetium-99m tricarbonyl intermediate $[^{99m}$Tc(H$_2$O)$_3$(CO)$_3]^+$ was prepared in a one-step procedure by direct reduction of aqueous $[^{99m}$TcO$_4]^-$ in the presence of carbon monoxide gas and borohydride (e.g. NaBH$_4$) as reducing agent. In view of the use of highly toxic gas CO in this process, they made some further improvement in which solid K$_2$[H$_3$BCO$_2$] was used as CO source and reducing agent instead of CO and NaBH$_4$, and Tc(VII) was similarly reduced to Tc(I) to produce the technetium-99m tricarbonyl intermediate $[^{99m}$Tc(H$_2$O)$_3$(CO)$_3]^+$. Both of the methods are carried out under heating, and the synthetic conditions thereof are shown in the reaction schemes below.

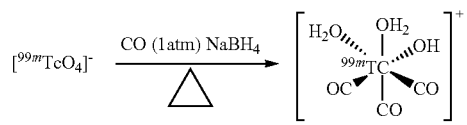

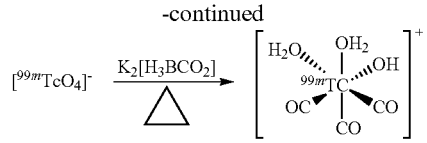

However, the methods above-mentioned each has defects, for example, the use of gaseous CO, the complicated preparation of K$_2$[H$_3$BCO$_2$], the labeling under condition of heating, etc. These defects hinder their clinical application and promotion in hospital. It is currently an important subject to be solved in the technical field to explore a method of preparing the technetium-99m tricarbonyl intermediate $[^{99m}$Tc(H$_2$O)$_3$(CO)$_3]^+$ at the condition of atmospheric pressure, room temperature and aqueous solution.

SUMMARY OF THE INVENTION

In order to solve at least one of the technical problems in the prior art mentioned above, the present invention provides a method for preparing a technetium-99m tricarbonyl intermediate, comprising reacting a manganese carbonyl compound as a carbon monoxide source with pertechnetate and water to obtain the technetium-99m tricarbonyl intermediate.

According to one embodiment of the present invention, the manganese carbonyl compound is one or more selected from the group consisting of manganese carbonyl, manganese pentacarbonyl halide, cyclopentadienyl manganese tricarbonyl, methyl cyclopentadienyl manganese tricarbonyl, cyclopentadienecarboxylic acid manganese tricarbonyl, and 1-cyclop entadiene manganese tricarbonyl-N,N,N-trimethylammonium borohydride.

According to one embodiment of the present invention, the method comprises reacting the pertechnetate with the manganese carbonyl compound and water in the presence of a reducing agent to obtain the technetium-99m tricarbonyl intermediate, and the manganese carbonyl compound is manganese carbonyl and/or manganese pentacarbonyl halide.

According to one embodiment of the present invention, the method comprises reacting the pertechnetate with the manganese carbonyl compound and water in the presence of a reducing agent under UV light irradiation to obtain the technetium-99m tricarbonyl intermediate, wherein the manganese carbonyl compound is one or more selected from the group consisting of cyclopentadienyl manganese tricarbonyl, methyl cyclopentadienyl manganese tricarbonyl and cyclopentadienecarboxylic acid manganese tricarbonyl.

According to one embodiment of the present invention, the reducing agent is sodium borohydride or ammonia borane.

According to one embodiment of the present invention, the method comprises mixing the manganese carbonyl compound, sodium borohydride as the reducing agent, potassium sodium tartrate, sodium carbonate, and the pertechnetate aqueous solution, and then keeping the reaction proceeding for 10 to 30 minutes under UV light irradiation to obtain the technetium-99m tricarbonyl intermediate; or mixing the manganese carbonyl compound, ammonia borane as the reducing agent, concentrated phosphoric acid, and the pertechnetate aqueous solution, and then keeping the reaction proceeding for 10 to 30 minutes under UV light irradiation to obtain the technetium-99m tricarbonyl intermediate;

wherein the manganese carbonyl compound is one or more selected from the group consisting of cyclopentadienyl manganese tricarbonyl, methyl cyclopentadienyl manganese tricarbonyl and cyclopentadienecarboxylic acid manganese tricarbonyl.

According to one embodiment of the present invention, the method comprises reacting the pertechnetate with 1-cyclopentadiene manganese tricarbonyl-N,N,N-trimethylammonium borohydride and water under UV light irradiation to obtain the technetium-99m tricarbonyl intermediate.

According to one embodiment of the present invention, the wavelength of the UV light is from 300 to 400 nm and a glass container is used as reaction vessel in the reaction.

According to one embodiment of the present invention, the 1-cyclopentadiene manganese tricarbonyl-N,N,N-trimethylammonium borohydride is prepared by a process comprising:

reacting cyclopentadienyl manganese tricarbonyl with dimethylformamide in the presence of n-butyllithium to obtain cyclopentadiene formaldehyde manganese tricarbonyl;

making the cyclopentadiene formaldehyde manganese tricarbonyl react in the presence of dimethylformamide and formic acid to obtain 1-cyclopentadiene manganese tricarbonyl-N,N-dimethylmethanamine; and making the 1-cyclopentadiene manganese tricarbonyl-N,N-dimethylmethanamine react in the presence of methyl iodide and sodium borohydride to obtain the 1-cyclopentadiene manganese tricarbonyl-N,N,N-trimethylammonium borohydride.

According to one embodiment of the present invention, the method comprises mixing the 1-cyclopentadiene manganese tricarbonyl-N,N,N-trimethylammonium borohydride with the pertechnetate aqueous solution, and then keeping the reaction proceeding for 10 to 30 minutes under UV light irradiation to obtain the technetium-99m tricarbonyl intermediate.

A method for preparing the technetium-99m tricarbonyl intermediate in one embodiment of the invention can be accomplished at atmospheric pressure and room temperature. The method is easy to operate, uses easily obtained raw materials, has a high labeling yield, and can be used to prepare various types of technetium tricarbonyl labeled probes.

DETAILED DESCRIPTION

Figure 1:
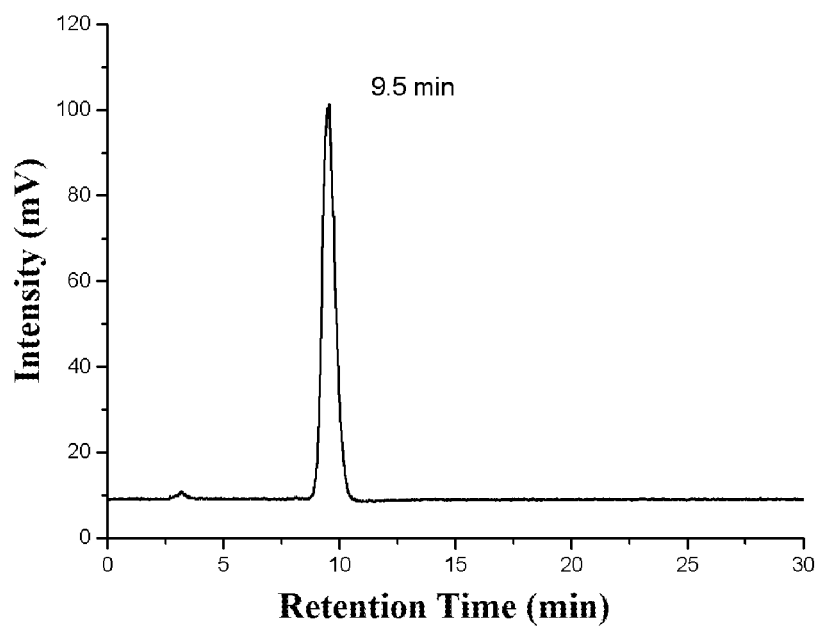
FIG. 1 shows the HPLC chromatograms of the intermediate [$^{99m}$Tc(H$_2$O)$_3$(CO)$_3$]$^+$ obtained in Example 2 of the present invention.

Hereinafter, the representative embodiments with the features and the advantages of the present invention will be described in more detail. It should be understood that various changes can be made without departing from the spirit or scope of the invention. The descriptions and the drawings herein are only illustrative, and should not be construed as limiting in any way.

A method for preparing the technetium-99m tricarbonyl intermediate in one embodiment of the present invention comprises using the manganese carbonyl compound as the carbon monoxide source to react with pertechnetate and water to obtain the technetium-99m tricarbonyl intermediate. The manganese carbonyl compound could be used as the carbon monoxide source for being able to release CO. Therefore, there is no need to use the toxic carbon monoxide and the materials are easy to get.

A method for preparing the technetium-99m tricarbonyl intermediate in one embodiment of the present invention has a simple process and can produce the intermediate at atmospheric pressure and room temperature. Therefore, the possible problems of reaction vessel's damage, pollution, and radioactive contamination caused by the heating method of water bath or metal bath, could be avoided in the clinical preparation process.

And the manganese carbonyl compound may be manganese carbonyl Mn$_2$(CO)$_{10}$, cyclopentadiene manganese tricarbonyl compound, or manganese pentacarbonyl halide Mn(CO)$_5$X, X may be selected from Cl, Br, I, etc., preferably Br, and the cyclopentadiene manganese tricarbonyl compound may have a formula of

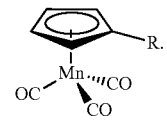

R may be H, CH$_3$, COOH, or CH$_2$N$^+$Me$_3$BH$_4^-$. The cyclopentadiene manganese tricarbonyl compound may specifically be cyclopentadienyl manganese tricarbonyl (R=H), methyl cyclopentadienyl manganese tricarbonyl (R=CH$_3$), and cyclopentadienecarboxylic acid manganese tricarbonyl (R=COOH), 1-cyclopentadiene manganese tricarbonyl-N,N,N-trimethylammonium borohydride (R=CH$_2$N$^+$Me$_3$BH$_4^-$), etc.

The reaction formula for preparing the technetium-99m tricarbonyl intermediate in one embodiment of the present invention is as below, only the formula of the main reactant is shown and water is omitted.

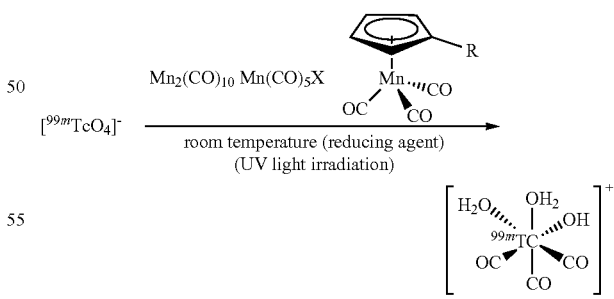

The conditions of the above reaction vary according to the carbon monoxide source. For example, the reaction could be carried out in the presence or absence of a reducing agent, and the reaction could be carried out under or without UV light irradiation.

More specifically, for example, 1-cyclopentadiene manganese tricarbonyl-N,N,N-trimethylammonium borohydride could be used as the carbon monoxide source and the reducing agent at the same time. When 1-cyclopentadiene manganese tricarbonyl-N,N,N-trimethylammonium borohydride is used as the carbon monoxide source, there is no need an additional reducing agent. However, when manganese carbonyl, manganese pentacarbonyl bromide, cyclopentadienyl manganese tricarbonyl (R=H), methyl cyclopentadienyl manganese tricarbonyl (R=CH$_3$), or cyclopentadienecarboxylic acid manganese tricarbonyl (R=COOH) is used as the carbon monoxide source, an additional reducing agent is needed. As another example, when manganese carbonyl or manganese pentacarbonyl bromide is used as the carbon monoxide source, there is no need UV light irradiation; when cyclopentadienyl manganese tricarbonyl (R=H), methyl cyclopentadienyl manganese tricarbonyl (R=CH$_3$), cyclopentadienecarboxylic acid manganese tricarbonyl (R=COOH), or 1-cyclopentadiene manganese tricarbonyl-N,N,N-trimethylammonium borohydride is used as the carbon monoxide source, the UV light irradiation is needed.

In one embodiment of the present invention, the cyclopentadienecarboxylic acid manganese tricarbonyl may be prepared by the reaction of cyclopentadienyl manganese tricarbonyl with dry ice (carbon dioxide) in the presence of n-butyllithium.

In one embodiment of the present invention, 1-cyclopentadiene manganese tricarbonyl-N,N,N-trimethylammonium borohydride may be prepared by the method as below, reacting cyclopentadienyl manganese tricarbonyl with dimethylformamide (DMF) in the presence of n-butyllithium to obtain cyclopentadiene formaldehyde manganese tricarbonyl;

making the cyclopentadiene formaldehyde manganese tricarbonyl react in the presence of DMF and formic acid to obtain 1-cyclopentadiene manganese tricarbonyl-N,N-dimethylmethanamine;

making the 1-cyclopentadiene manganese tricarbonyl-N,N-dimethylmethanamine react in the presence of methyl iodide and sodium borohydride to obtain 1-cyclopentadiene manganese tricarbonyl-N,N,N-trimethylammonium borohydride.

In one embodiment of the present invention, the pertechnetate may be supplied by the pertechnetate $^{99m}TcO_4^-$ solution eluted from a medical $^{99}Mo$-$^{99m}Tc$ generator. In addition, the pertechnetate content in the eluent is low; therefore an excessive amount of manganese carbonyl compound is added so that most amount of the pertechnetate can react.

In a method for preparing the technetium-99m tricarbonyl intermediate according to one embodiment of the present invention, the UV light refers to the light with a wavelength of 10 to 400 nm, preferably 250 to 400 nm, e.g. 254 nm, more preferably 300 to 400 nm, e.g. 365 nm. The light of wavelength 254 or 365 nm can be obtained by a hand-held UV lamp.

In one embodiment of the present invention, the UV light has a wavelength of 254 nm and a quartz bottle may be used as the reaction vessel.

In another embodiment of the present invention, the UV light has a wavelength of 300 to 400 nm, e.g. 365 nm, and a glass bottle or quartz bottle may be used as the reaction vessel.

A method for preparing the technetium-99m tricarbonyl intermediate in one embodiment of the present invention could be accomplished just by using an ordinary glass reaction bottle and a hand-held UV lamp, which simplifies the radioactive operation and is convenient for the application and spreading of the technetium tricarbonyl radiopharmaceuticals.

The present invention has no limit to the reducing agent, for example, the reducing agent may be sodium borohydride (NaBH$_4$) or ammonia borane (NH$_3$BH$_3$).

A method for preparing the technetium-99m tricarbonyl intermediate in one embodiment of the present invention using sodium borohydride as the reducing agent specifically comprises steps of:

adding the manganese carbonyl compound and sodium borohydride used as the reducing agent to a reaction vessel;

adding potassium sodium tartrate and sodium carbonate used as pH adjusting agents to the reaction vessel;

adding the pertechnetate $^{99m}TcO_4^-$ eluent obtained from the medical $^{99}Mo$-$^{99m}Tc$ generator to the reaction vessel;

sealing the reaction vessel with a reaction proceeding for 10 to 30 minutes under UV light irradiation;

filtering the solution obtained after the reaction by a syringe to remove a small amount of insoluble matter.

In the above steps, the manganese carbonyl compound may be cyclopentadienyl manganese tricarbonyl, methyl cyclopentadienyl manganese tricarbonyl, or cyclopentadienecarboxylic acid manganese tricarbonyl, and the amounts may be 1 to 250 mg for the manganese carbonyl compound, 1 to 10 mg for the reducing agent, 1 to 40 mg for the potassium sodium tartrate, and 1 to 10 mg for the sodium carbonate. The pH after adjustment may be 10 to 12 as the reaction occurs. The UV light may come from a hand-held UV lamp; when the wavelength of the UV light is 365 nm, a glass bottle or quartz bottle may be used as the reaction vessel; and when the wavelength is 254 nm, a quartz bottle may be used as the reaction vessel.

A method for preparing the technetium-99m tricarbonyl intermediate in another embodiment of the present invention using ammonia borane as the reducing agent specifically comprises steps of:

adding the manganese carbonyl compound and ammonia borane used as the reducing agent to a reaction vessel;

adding concentrated phosphoric acid used as a pH adjusting agent to the reaction vessel;

adding the pertechnetate $^{99m}TcO_4^-$ eluent obtained from the medical $^{99}Mo$-$^{99m}Tc$ generator to the reaction vessel;

sealing the reaction vessel with a reaction proceeding for 10 to 30 minutes under UV light irradiation;

filtering the solution obtained after the reaction by a syringe to remove a small amount of insoluble matter.

In the above steps, the manganese carbonyl compound may be cyclopentadienyl manganese tricarbonyl, methyl cyclopentadienyl manganese tricarbonyl, or cyclopentadienecarboxylic acid manganese tricarbonyl. The added amount may be 1 to 100 mg for the manganese carbonyl compound, 1 to 10 mg for the reducing agent and 1 to 40 μL for concentrated phosphoric acid. The pH after adjustment may be 2 to 4 as the reaction occurs.

A method for preparing the technetium-99m tricarbonyl intermediate in another embodiment of the present invention, using 1-cyclopentadiene manganese tricarbonyl-N,N,N-trimethylammonium borohydride as the carbon monoxide source and without an additional reducing agent, specifically comprises steps of:

adding 1-cyclopentadiene manganese tricarbonyl-N,N,N-trimethylammonium borohydride to a reaction vessel;

adding the pertechnetate $^{99m}TcO_4^-$ eluent obtained from the medical $^{99}Mo$-$^{99m}Tc$ generator to the reaction vessel;

sealing the reaction vessel with a reaction proceeding for 10 to 30 minutes under UV light irradiation;

filtering the solution obtained after the reaction by a syringe to remove a small amount of insoluble matter.

In the above steps, the added amount of 1-cyclopentadiene manganese tricarbonyl-N,N,N-trimethylammonium borohydride may be 0.1 to 20 mg.

A method for preparing the technetium-99m tricarbonyl intermediate in one embodiment of the present invention comprises using the manganese carbonyl compound as the carbon monoxide source under the conditions of with or without an additional reducing agent, with or without UV irradiation, atmospheric pressure, room temperature and aqueous solution to obtain the technetium-99m tricarbonyl intermediate $[^{99m}Tc(H_2O)_3(CO)_3]^+$.

A method for preparing the technetium-99m tricarbonyl intermediate in one embodiment of the invention is easy to operate, uses easily obtained raw materials, has a high labeling yield, and can be used to prepare various types of technetium tricarbonyl labeled probes.

Hereinafter, the method for preparing the technetium-99m tricarbonyl intermediate of the present invention will be further described by way of examples. The reagents used are all commercially available. The polyamide thin layer chromatography is used with acetonitrile or normal saline as a developing solvent. The conditions of radioactive high performance liquid chromatography (radio-HPLC) comprise an instrument of HITACHI (D-2000), a Kromaisl C18 column (250×4.6 mm, 5 μm, 100 Å), water (0.1% TFA) as A phase, methanol (0.1% TFA) as B phase, a washing gradient of: 0-3 min, 5% B phase; 3-3.1 min, 5%~25% B phase; 3.1-9 min, 25% B phase; 9-9.1 min, 25%~34% B phase; 9.1-20 min, 34%~100% B phase; 20-25 min, 100% B phase; 25-25.1 min, 100%~5% B phase; 25.1-30 min, 5% B phase; and a flow rate of 1 mL/min.

Example 1

The technetium tricarbonyl intermediate was prepared by using cyclopentadienyl manganese tricarbonyl as the carbon monoxide source and sodium borohydride as the reducing agent.

200 mg of cyclopentadienyl manganese tricarbonyl, 10 mg of sodium borohydride, 20 mg of potassium sodium tartrate, and 4 mg of sodium carbonate were weighed and added to a quartz bottle before the addition of 1 mL (37 MBq) freshly prepared $^{99m}TcO_4^-$ eluent. After being shaken greatly, the quartz bottle was sealed and placed under a hand-held UV lamp (254 nm) with a reaction proceeding for 20 min at room temperature. After the reaction, the mixture obtained was adjusted to a pH of 6 to 7 by 0.1 mol/L hydrochloric acid and filtered by a syringe to obtain the product technetium tricarbonyl intermediate $[^{99m}Tc(H_2O)_3(CO)_3]^+$. HPLC analysis revealed the product peak with a retention time of 9.2 min and a labeling yield of 96%.

Example 2

The technetium tricarbonyl intermediate was prepared by using methyl cyclopentadienyl manganese tricarbonyl as the carbon monoxide source and sodium borohydride as the reducing agent.

20 mg of methyl cyclopentadienyl manganese tricarbonyl, 5.5 mg of sodium borohydride, 20 mg of potassium sodium tartrate, and 4 mg of sodium carbonate were weighed and added to a penicillin bottle before the addition of 1 mL (37 MBq) freshly prepared $^{99m}TcO_4^-$ eluent. After being shaken greatly, the penicillin bottle was sealed and placed under a hand-held UV lamp (365 nm) with a reaction proceeding for 20 min at room temperature. After the reaction, the mixture obtained was adjusted to a pH of 6 to 7 by 0.1 mol/L hydrochloric acid and filtered by a syringe to obtain the product technetium tricarbonyl intermediate $[^{99m}Tc(H_2O)_3(CO)_3]^+$. HPLC analysis revealed the product peak with a retention time of 9.5 min and a labeling yield of 98%, and the chromatograms was shown in FIG. 1.

Example 3

Preparation of Cyclopentadienecarboxylic Acid Manganese Tricarbonyl

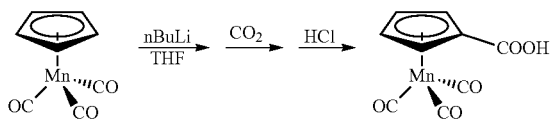

1 g of cyclopentadienyl manganese tricarbonyl was weighed and dissolved in 10 mL anhydrous tetrahydrofuran. A solution of N-butyl lithium in hexane (3.37 mL, 1.6 mol/L) was dropwise added to the tetrahydrofuran solution under the protection of −45° C. argon. After the dropwise addition, excess dry ice was added to obtain a mixture which was stirred at room temperature for 2 h. After the reaction, the solvent was evaporated under reduced pressure, and then water and ethyl acetate were added to the mixture obtained with being shaken greatly. Hydrochloric acid was added to the water phase to produce precipitate which was collected and dried obtaining 0.76 g yellow powder (cyclopentadienecarboxylic acid manganese tricarbonyl) with a yield of 62.5%.

Preparation of the Technetium Tricarbonyl Intermediate $[^{99m}Tc(H_2O)_3(CO)_3]^+$ The technetium tricarbonyl intermediate was prepared by using cyclopentadienecarboxylic acid manganese tricarbonyl as the carbon monoxide source and sodium borohydride as the reducing agent.

100 mg of cyclopentadienecarboxylic acid manganese tricarbonyl, 6 mg of sodium borohydride, 20 mg of potassium sodium tartrate, and 4 mg of sodium carbonate were weighed and added to a penicillin bottle before the addition of 1 mL (37 MBq) freshly prepared $^{99m}TcO_4^-$ eluent. After being shaken greatly, the penicillin bottle was sealed and placed under a hand-held UV lamp (365 nm) with a reaction proceeding for 20 min at room temperature. After the reaction, the mixture obtained was adjusted to a pH of 6 to 7 by 0.1 mol/L hydrochloric acid and filtered by a syringe to obtain the product technetium tricarbonyl intermediate $[^{99m}Tc(H_2O)_3(CO)_3]^+$. HPLC analysis revealed the product peak with a retention time of 8.9 min and a labeling yield of 98%.

Example 4

The technetium tricarbonyl intermediate was prepared by using methyl cyclopentadienyl manganese tricarbonyl as the carbon monoxide source and ammonia borane as the reducing agent.

50 mg of methyl cyclopentadienyl manganese tricarbonyl and 5 mg of ammonia borane were weighed and added to a penicillin bottle before the addition of 10 μL concentrated phosphoric acid and 1 mL (37 MBq) freshly prepared $^{99m}TcO_4^-$ eluent. After being shaken greatly, the penicillin bottle was sealed and placed under a hand-held UV lamp (365 nm) with a reaction proceeding for 20 min at room temperature. After the reaction, the mixture obtained was adjusted to a pH of 6 to 7 by 0.1 mol/L sodium hydroxide and filtered by a syringe to obtain the product technetium tricarbonyl intermediate [$^{99m}$Tc(H$_2$O)$_3$(CO)$_3$]$^+$. HPLC analysis revealed the product peak with a retention time of 9.3 min and a labeling yield of 95%.

Example 5

Preparation of 1-cyclopentadiene manganese tricarbonyl-N,N,N-trimethylammonium borohydride

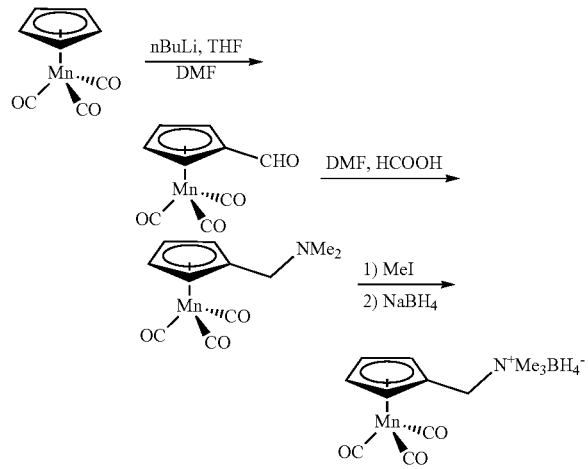

5 g of cyclopentadienyl manganese tricarbonyl was weighed and dissolved in 60 mL anhydrous tetrahydrofuran. A solution of N-butyl lithium in hexane (19.1 mL, 1.6 mol/L) was dropwise added to the tetrahydrofuran solution under the protection of −78° C. argon. After the dropwise addition, 4.84 mL DMF was added to obtain a mixture which was stirred at room temperature for 2 h. After the reaction, 200 mL hydrochloric acid (3 N) was added to the resultant mixture, then 200 mL water was added, and the mixture obtained was extracted with hexane. The organic phase was washed with water and dried with anhydrous sodium sulfate, and after a process of reduced pressure distillation, 5.37 g brown solid (cyclopentadiene formaldehyde tricarbonyl manganese) was obtained with a yield of 94.5%.

1.5 g cyclopentadiene formaldehyde tricarbonyl manganese obtained was added to 1.75 mL DMF, and then 1 mL formic acid was added. The mixture was kept away from light and heated to 150-160° C. with a reaction proceeding for 3 h. After the reaction, the resultant mixture was cooled to room temperature. 30 mL hydrochloric acid (3 N) was added, and the mixture was extracted with hexane. The water phase was alkalified by 6N NaOH and extracted with ethyl acetate. The organic phase was washed with water and dried obtaining 0.73 g red-brown grease (1-cyclopentadiene tricarbonyl manganese-N,N-dimethylmethanamine) with a yield of 43.4% after a process of reduced pressure distillation.

0.73 g 1-cyclopentadiene tricarbonyl manganese-N,N-dimethylmethanamine was weighed and dissolved in 2 mL acetone. 0.8 mL iodomethane was dropwise added under the protection of 0° C. argon. The mixture was stirred continuously at the temperature of 0° C. for 0.5 h. The solvent was evaporated under reduced pressure, and 15 mL acetonitrile was added to dissolve the slightly yellow solid totally. 0.266 g of sodium borohydride was added to the mixture at room temperature under the protection of argon with a reaction proceeding for 6 h under the condition of stirring. The resultant mixture was filtered to remove a small amount of insoluble substance and dichloromethane was added after removing the solvent by reduced pressure distillation. Then, 0.7 g yellow solid (1-cyclopentadiene manganese tricarbonyl-N,N,N-trimethylammonium borohydride) was obtained by filtration with a yield of 86%.

Preparation of the Technetium Tricarbonyl Intermediate [$^{99m}$Tc(H$_2$O)$_3$(CO)$_3$]$^+$ The technetium tricarbonyl intermediate was prepared by using 1-cyclopentadiene manganese tricarbonyl-N,N,N-trimethylammonium borohydride as the carbon monoxide source and the reducing agent at the same time.

5 mg of 1-cyclopentadiene manganese tricarbonyl-N,N,N-trimethylammonium borohydride was weighed and added to a penicillin bottle before the addition of 1 mL (37 MBq) freshly prepared $^{99m}$TcO$_4^-$ eluent. After being shaken greatly, the penicillin bottle was sealed and placed under a hand-held UV lamp (365 nm) with a reaction proceeding for 20 min at room temperature. After the reaction, the mixture obtained was adjusted to a pH of 6 to 7 by 0.1 mol/L hydrochloric acid and filtered by a syringe to obtain the product technetium tricarbonyl intermediate [$^{99m}$Tc(H$_2$O)$_3$(CO)$_3$]$^+$. HPLC analysis revealed the product peak with a retention time of 9.1 min and a labeling yield of 96%.

Example 6

The technetium tricarbonyl intermediate was prepared by using manganese carbonyl as the carbon monoxide source and sodium borohydride as the reducing agent.

5 mg of manganese carbonyl, 5.5 mg of sodium borohydride, 20 mg of potassium sodium tartrate, and 4 mg of sodium carbonate were weighed and added to a penicillin bottle before the addition of 1 mL (37 MBq) freshly prepared $^{99m}$TcO$_4^-$ eluent. After being shaken greatly, the penicillin bottle was sealed with a reaction proceeding for 20 min at room temperature. After the reaction, the mixture obtained was adjusted to a pH of 6 to 7 by 0.1 mol/L hydrochloric acid and filtered by a syringe to obtain the product technetium tricarbonyl intermediate [$^{99m}$Tc(H$_2$O)$_3$(CO)$_3$]$^+$. HPLC analysis revealed the product peak with a retention time of 8.8 min and a labeling yield of 51%.

Example 7

The technetium tricarbonyl intermediate was prepared by using pentacarbonyl manganese bromide as the carbon monoxide source and sodium borohydride as the reducing agent.

5 mg of pentacarbonyl manganese bromide, 5.5 mg of sodium borohydride, 20 mg of potassium sodium tartrate, and 4 mg of sodium carbonate were weighed and added to a penicillin bottle before the addition of 1 mL (37 MBq) freshly prepared $^{99m}$TcO$_4^-$ eluent. After being shaken greatly, the penicillin bottle was sealed with a reaction proceeding for 20 min at room temperature. After the reaction, the mixture obtained was adjusted to a pH of 6 to 7 by 0.1 mol/L hydrochloric acid and filtered by a syringe to obtain the product technetium tricarbonyl intermediate

[$^{99m}$Tc(H$_2$O)$_3$(CO)$_3$]$^+$. HPLC analysis revealed the product peak with a retention time of 8.9 min and a labeling yield of 98%.

Comparative Example

Figure 2:
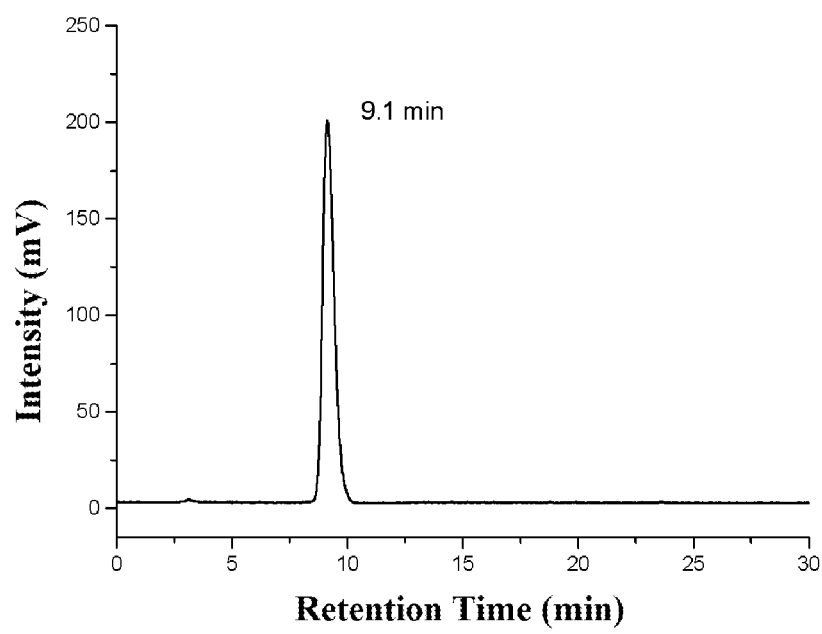
FIG. 2 shows the HPLC chromatograms of the intermediate [$^{99m}$Tc(H$_2$O)$_3$(CO)$_3$]$^+$ obtained in Comparative Example.

The technetium tricarbonyl intermediate [$^{99m}$Tc(H$_2$O)$_3$(CO)$_3$]$^+$ in the comparative example was prepared by the wet process described in the background, in which aqueous [$^{99m}$TcO$_4$]$^-$ was reduced by NaBH$_4$ in the presence of gaseous carbon monoxide. 5.5 mg of sodium borohydride, 20 mg of potassium sodium tartrate, and 4 mg of sodium carbonate were weighed and added to a penicillin bottle, which was then sealed and carbon monoxide gas was introduced therein for 10 min 1 mL (37 MBq) freshly prepared $^{99m}$TcO$_4^-$-eluent was added to the penicillin bottle which was shaken greatly with a reaction proceeding for 20 min in a water bath at 100° C. After the reaction, the mixture obtained was adjusted to a pH of 6 to 7 by (Limon hydrochloric acid and filtered by a syringe to obtain the product technetium tricarbonyl intermediate [$^{99m}$Tc(H$_2$O)$_3$(CO)$_3$]$^+$. HPLC analysis revealed the product peak with a retention time of 9.1 min and a labeling yield of 98%, and the chromatograms was shown in FIG. 2.

All of the technetium tricarbonyl intermediates prepared by the above examples are identified by thin layer chromatography and radioactive high performance liquid chromatography with radiochemical purities above 95% (except using manganese carbonyl as the carbon monoxide source, Example 6). The intermediates have good stability for the reason that there are no changes in the radiochemical purity after being left for 4 h at room temperature.

Hereinafter, the technetium tricarbonyl intermediates [$^{99m}$Tc(H$_2$O)$_3$(CO)$_3$]$^+$ prepared by the examples of the present invention were used to produce various types of tricarbonyl technetium labels.

Application Example 1

Figure 3:
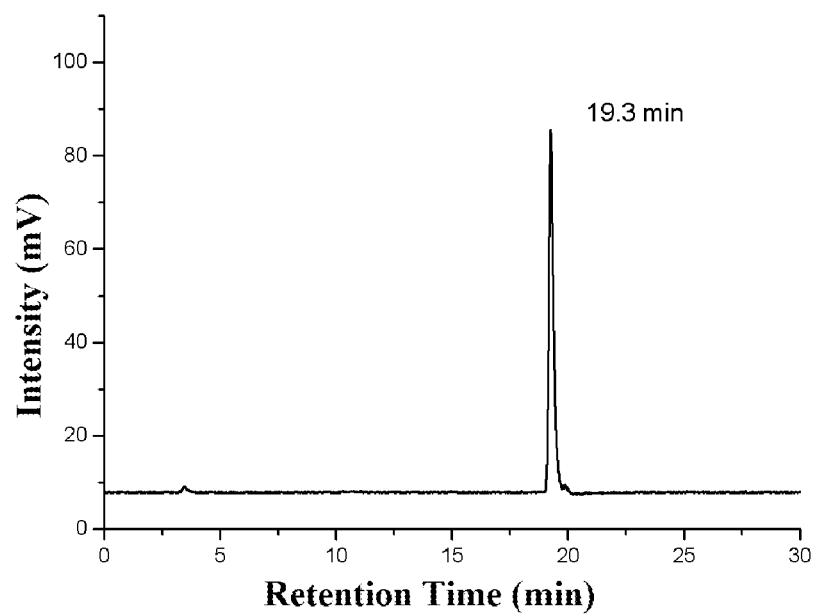
FIG. 3 shows the HPLC chromatograms of the technetium-99m tricarbonyl methoxy isobutyl isonitrile obtained in Application Example 1 of the present invention.

Preparation of Technetium Tricarbonyl Methoxy Isobutyl Isonitrile $^{99m}$Tc(CO)$_3$(MIBI)$_3$ The pH of the technetium tricarbonyl intermediate [$^{99m}$Tc(H$_2$O)$_3$(CO)$_3$]$^+$ prepared in Example 2 was adjusted to about 6-7. About 10 mg of methoxy isobutyl isonitrile (MIBI) was dissolved in 5 mL alcohol in a reaction vessel and the technetium tricarbonyl intermediate above-mentioned was added to the mixture. After sealed, the reaction vessel was heated to 70° C. with a reaction proceeding for 20 min to produce the technetium tricarbonyl methoxy isobutyl isonitrile, which was identified by thin layer chromatography and radioactive high performance liquid chromatography with a radiochemical purity of above 98%. HPLC analysis revealed the product peak with a retention time of 19.3 min and the chromatograms was shown in FIG. 3.

Application Example 2

Preparation of Technetium Tricarbonyl Histidine $^{99m}$Tc(CO)$_3$His

Figure 4:
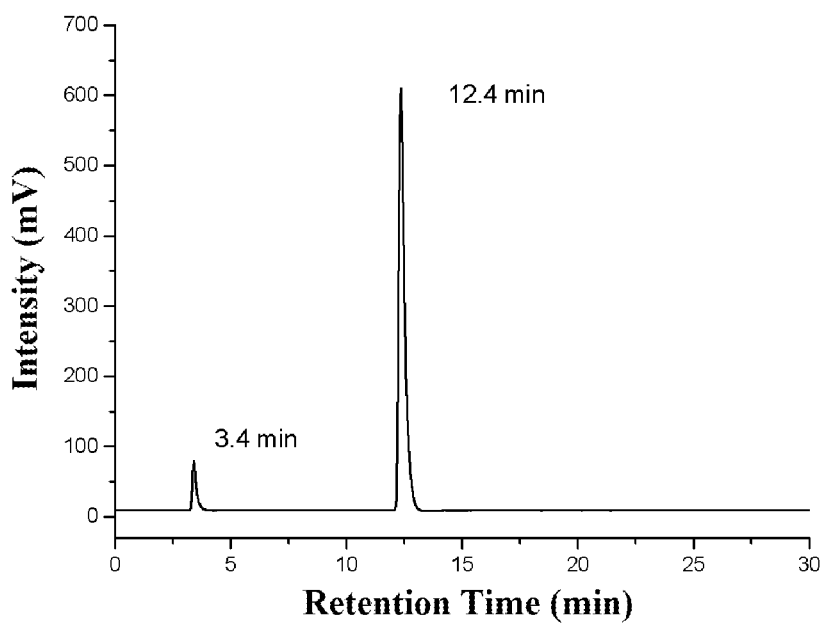
FIG. 4 shows the HPLC chromatograms of the technetium tricarbonyl histidine obtained in Application Example 2 of the present invention.

The pH of the technetium tricarbonyl intermediate [$^{99m}$Tc(H$_2$O)$_3$(CO)$_3$]$^+$ prepared in Example 5 was adjusted to about 6-7. About 5 mg of L-histidine was dissolved in 0.5 mL water in a reaction vessel and the technetium tricarbonyl intermediate above-mentioned was added to the mixture. After sealed, the reaction vessel was heated to 70° C. with a reaction proceeding for 20 min to produce the technetium tricarbonyl histidine, which was identified by thin layer chromatography and radioactive high performance liquid chromatography with a radiochemical purity of above 98%. HPLC analysis revealed the product peak with a retention time of 12.4 min and the chromatograms was shown in FIG. 4.

Unless otherwise defined, the terms used in the present invention have the common meanings understood by those skilled in the art.

The embodiments described herein are for illustrative purposes only, and are not intended to limit the scope of the invention, and those skilled in the art can make various alternatives, changes and modifications within the scope of the invention. The invention is not limited to the above embodiments and is only limited by the appended claims.

What is claimed is:

1. A method for preparing a technetium-99m tricarbonyl intermediate, comprising reacting at room temperature a manganese carbonyl compound as a carbon monoxide source with pertechnetate and water to obtain the technetium-99m tricarbonyl intermediate, wherein the technetium-99m tricarbonyl intermediate is [$^{99m}$Tc(H$_2$O)$_3$(CO)$_3$]$^+$;

wherein the pertechnetate reacts at room temperature with the manganese carbonyl compound and water in the presence of a reducing agent and the manganese carbonyl compound is manganese carbonyl and/or manganese pentacarbonyl halide;

the pertechnetate reacts at room temperature with the manganese carbonyl compound and water in the presence of a reducing agent under UV light irradiation and the manganese carbonyl compound is one or more selected from the group consisting of cyclopentadienyl manganese tricarbonyl, methyl cyclopentadienyl manganese tricarbonyl and cyclopentadienecarboxylic acid manganese tricarbonyl; or the pertechnetate reacts at room temperature with 1-cyclopentadiene manganese tricarbonyl-N,N,N-trimethylammonium borohydride and water under UV light irradiation.

2. The method according to claim 1, wherein the reducing agent is sodium borohydride or ammonia borane.

3. The method according to claim 2, which comprises mixing the manganese carbonyl compound, sodium borohydride as the reducing agent, potassium sodium tartrate, sodium carbonate, and the pertechnetate aqueous solution, and then keeping the reaction proceeding at room temperature for 10 to 30 minutes under UV light irradiation to obtain the technetium-99m tricarbonyl intermediate; or mixing the manganese carbonyl compound, ammonia borane as the reducing agent, concentrated phosphoric acid, and the pertechnetate aqueous solution, and then keeping the reaction proceeding at room temperature for 10 to 30 minutes under UV light irradiation to obtain the technetium-99m tricarbonyl intermediate;

wherein the manganese carbonyl compound is one or more selected from the group consisting of cyclopentadienyl manganese tricarbonyl, methyl cyclopentadienyl manganese tricarbonyl and cyclopentadienecarboxylic acid manganese tricarbonyl.

4. The method according to claim 1, wherein the wavelength of the UV light is from 300 to 400 nm, and a glass container is used as reaction vessel in the reaction.

5. The method according to claim 1, wherein the 1-cyclopentadiene manganese tricarbonyl-N,N,N-trimethylammonium borohydride is prepared by a process comprising:

reacting cyclopentadienyl manganese tricarbonyl with dimethylformamide in the presence of n-butyllithium to obtain cyclopentadiene formaldehyde manganese tricarbonyl;

making the cyclopentadiene formaldehyde manganese tricarbonyl react in the presence of dimethylformamide and formic acid to obtain 1-cyclopentadiene manganese tricarbonyl-N,N-dimethylmethanamine; and making the 1-cyclopentadiene manganese tricarbonyl-N,N-dimethylmethanamine react in the presence of methyl iodide and sodium borohydride to obtain the 1-cyclopentadiene manganese tricarbonyl-N,N,N-trimethylammonium borohydride.

6. The method according to claim 1, which comprises mixing the 1-cyclopentadiene manganese tricarbonyl-N,N,N-trimethylammonium borohydride with the pertechnetate aqueous solution, and then keeping the reaction proceeding at room temperature for 10 to 30 minutes under UV light irradiation to obtain the technetium-99m tricarbonyl intermediate.

* * * * *